(12) United States Patent
Haentzschel et al.

(10) Patent No.: US 7,633,996 B2
(45) Date of Patent: Dec. 15, 2009

(54) METHOD AND DEVICE FOR DETERMINING THE OCCUPANCY OF A TRANSMISSION CHANNEL

(75) Inventors: Dirk Haentzschel, Duerroehrsdorf-Dittersbach (DE); Thomas Hanusch, Coswig (DE); Eric Sachse, Dresden (DE)

(73) Assignee: Atmel Automotive GmbH, Heilbronn (DE)

( * ) Notice: Subject to any disclaimer, the term of this patent is extended or adjusted under 35 U.S.C. 154(b) by 591 days.

(21) Appl. No.: 11/448,036

(22) Filed: Jun. 7, 2006

(65) Prior Publication Data
US 2006/0274863 A1 Dec. 7, 2006

(30) Foreign Application Priority Data
Jun. 7, 2005 (DE) .................. 10 2005 026 086

(51) Int. Cl.
*H04B 1/00* (2006.01)
(52) U.S. Cl. .................. 375/150; 375/130; 375/140; 375/142; 375/147; 375/343
(58) Field of Classification Search .......... 455/450; 375/150, 130, 147, 140, 142, 343; 370/335, 370/342, 441, 514, 515
See application file for complete search history.

(56) References Cited

U.S. PATENT DOCUMENTS 5,960,030 A 9/1999 Maruyama
2005/0036573 A1* 2/2005 Zhang et al. ................. 375/343

* cited by examiner

Primary Examiner—Mohammad H Ghayour
Assistant Examiner—Leila Malek
(74) Attorney, Agent, or Firm—Muncy, Geissler, Olds & Lowe, PLLC

(57) ABSTRACT

A method for determining the occupancy of a transmission channel using a differentially demodulated signal generated at a transmitter-side with the use of PN sequences from a PN sequence set having a first group of first PN sequences and a second group of second PN sequences. The method provides a) at least two subsequences of an initial code sequence, which is assigned to one of the first PN sequences and can be derived from the sequence by logical operations, but is not identical to it, b) the calculation of at least two correlation results by correlating the differentially demodulated signal with each of the at least two subsequences, and c) the evaluation of the correlation results and generation of an output signal to indicate the occupancy of the transmission channel. Also a device for determining the occupancy of a transmission channel.

22 Claims, 4 Drawing Sheets

METHOD AND DEVICE FOR DETERMINING THE OCCUPANCY OF A TRANSMISSION CHANNEL

This nonprovisional application claims priority under 35 U.S.C. § 119(a) to German Patent Application No. DE 102005026086, which was filed in Germany on Jul. 7, 2005, and which is herein incorporated by reference.

BACKGROUND OF THE INVENTION

1. Field of the Invention

The present invention relates to a method and a device for determining an occupancy of a transmission channel by a radio signal. The invention further relates to a transmitting/receiving device and an integrated circuit with such a device.

The invention falls within the field of data transmission. Although it can be used in principle in any digital communication system, the present invention and its underlying problem will be explained below with reference to a "ZigBee" communication system in accordance with IEEE 802.15.4.

2. Description of the Background Art

Wireless Personal Area Networks (WPANs) can be used for wireless transmission of information over relatively short distances (about 10 m). In contrast to Wireless Local Area Networks (WLANs), WPANS require little or even no infrastructure for data transmission, so that small, simple, power-efficient, and low-cost devices can be implemented for a wide range of applications.

Standard IEEE 802.15.4 specifies low-rate WLANs, which are suitable with raw data rates up to a maximum of 250 kb/s and stationary or mobile devices for applications in industrial monitoring and control, in sensor networks, in automation, and in the field of computer peripherals and for interactive games. In addition to a very simple and cost-effective implementability of the devices, an extremely low power demand of the device is of critical importance for such applications. Thus, an objective of this standard is a battery life of several months to several years.

At the level of the physical layer, in the virtually globally available 2.4 GHz ISM band (industrial, scientific, medical) for raw data rates of fB=250 kb/s, the IEEE standard 802.15.4 specifies a band spread (spreading) with a chip rate of fC=2 Mchip/s and an offset QPSK modulation (quadrature phase shift keying) with a symbol rate of fS=62.5 ksymbol/s.

In an 802.15.4 transmitter for the ISM band, the data stream to be transmitted is first converted to a sequence of PN sequences (pseudo noise) with the use of four databits in each symbol period (TS=1/fS=16 s), in order to select a PN sequence from a sequence set of a total of 16 PN sequences. Each symbol of four databits is assigned in this manner a symbol value-specific PN sequence of 32 PN chips (chip period TC=TS/32 =500 ns=1/fC), which is transmitted instead of the four databits. The sequence set of 16 "quasi-orthogonal" PN sequences, specified in the standard, in this case comprises a first group of eight first PN sequences, which differ from one another only in a cyclic shift of their chip values, and a second group of eight second PN sequences, which also differ from one another only in a cyclic shift of their chip values and from one of the first PN sequences only in an inversion of every second chip value (see IEEE Standard 802.15.4-2003, Chapter 6.5.2.3).

The PN sequences allocated to the successive symbols are linked together and then offset QPSK modulated (quadrature phase shift keying) by modulating, with half-sine pulse shaping, the even-indexed PN chips (0, 2, 4, . . . ) onto the in-phase (I) carrier and the odd-indexed PN chips (1, 3, 5, . . . ) onto the quadrature-phase (Q) carrier. To form an offset, the quadrature-phase chips are delayed by one chip period TC with respect to the in-phase chips (see IEEE Standard 802.15.4-2003, Chapter 6.5.2.4).

The data transmission occurs in principle with the use of frames. Useful data are transmitted in this case in so-called data frames ("data frame," PPDU), which contain in addition to the actual useful data ("data payload," MSDU) also check and control data, such as, e.g., a so-called synchronization header. This synchronization header (SHR), present at the start of each frame, comprises a so-called preamble sequence and a "start of frame delimiter" (SFD), which allows the receiver to synchronize and lock onto the data bit stream, so that the transmitted data can then be correctly detected. The preamble sequence has 32 binary zeros, whereas the following SFD field comprises the bit sequence "1 1 0 0 1 0 1" (see IEEE Standard 802.15.4-2003, Chapters 5.4.3 and 6.3.1).

To assure robust data transmission, various security mechanisms are specified at the level of the MAC layer (medium access control). Thus, every frame has a so-called cyclic redundancy code (CRC) at the end, which allows the receiver to detect bit errors. In addition, successful receipt of a data frame is acknowledged by the return of an optional confirmation frame. Furthermore, access to the transmission channel during the so-called contention access periods (CAP) occurs according to the CSMA-CA process (carrier sense multiple access with collision avoidance). In this case, each device that intends to transmit, e.g., a data frame, first waits for a time interval of a randomly selected duration and then checks the channel occupancy. If it is ascertained that the channel is free, the device can subsequently transmit its data. If the channel is occupied, however, the device must wait for another, again randomly selected time interval before it again attempts to access the channel. The use of this CSMA-CA process is intended to avoid collisions if possible, which arise when several devices transmit data simultaneously over the same (frequency) channel. Depending on the network configuration (with or without transmission of a so-called beacon), in this case either a "slotted" CSMA-CA variant directed to a specific time slot or "unslotted CSMA-CA," not bound to a specific time slot, of this security mechanism is used (see IEEE Standard 802.15.4-2003, Chapters 5.4.1-5.4.4 and 7.5.1).

To ascertain whether the channel may be accessed, the device must be able to determine at any time at the request of the MAC layer whether the channel is occupied ("busy"). For this purpose, it is specified at the level of the physical layer that each device must be capable of performing at least one of three CCA processes (clear channel assessment). In CCA mode 1, a channel is regarded as occupied when an energy above a certain threshold is present. In the modes 2 and 3 of interest here, this is to apply when the signal was detected that has the previously described band spread properties and modulation properties (mode 2) or when such a signal was detected and the energy was above the threshold (mode 3). If the requirement to determine the channel occupancy applies during the receipt of a data frame ("data frame," PPDU), the channel is to be classified as occupied regardless of the CCA process mode. The receipt of the data frame is regarded here as having been begun after the "start of frame delimiter" (SFD) was detected, i.e., after the receiver is synchronized (see IEEE Standard 802.15.4-2003, Chapter 6.7.9).

Nevertheless, a problematic case is that in which the requirement of determining channel occupancy applies when an 802.15.4 signal has already arrived at the receiver, but the receiver is not yet synchronized. This case can occur particularly shortly after the turning on of the device or waking from sleep mode, when the device wants to send data and determines the channel occupancy in advance. The applicant is not aware of any solution to this problem in the conventional art.

Both coherent and incoherent approaches are known per se to detect data symbols present in an incoming signal. Whereas in coherent approaches the incoming signal is converted into the complex envelope (baseband) with the use of a carrier wave of the same frequency and phase and obtained from the carrier control circuit, this can be omitted in incoherent approaches. Because of the higher realization cost in coherent approaches, which is also accompanied by an increased power requirement, in the present invention an incoherent receiver is used in which the incoming signal is converted at least not in-phase to the complex envelope and the resulting baseband signal is demodulated differentially.

SUMMARY OF THE INVENTION

It is therefore an object of the present invention to provide a method for determining (detecting) the occupancy of a transmission channel by a radio signal with the help of a differentially demodulated signal, which is also capable, when synchronization of the receiver has not yet occurred, to correctly determine the occupancy state of the transmission channel, i.e., to detect whether the channel is occupied by a signal with the aforementioned band spread properties and modulation properties. Furthermore, the method is to make possible power-saving and simple implementations of transmitting/receiving devices, e.g., according to IEEE 802.15.4. It is furthermore the object of the invention to disclose a device for determining the occupancy, as well as a transmitting/receiving device, and an integrated circuit.

This object is achieved as taught by the invention by a method, a device, a transmitting/receiving device, and an integrated circuit.

The method of the invention is to determine the occupancy of the transmission channel by a radio signal with the help of a differentially demodulated signal, which was generated transmitter-side with the use of PN sequences from a PN sequence set, which has a first group of first PN sequences and a second group of second PN sequences, wherein the first and second PN sequences within their respective group differ from one another only in a cyclic shift of their chip values and wherein the second group has for each first PN sequence a corresponding second PN sequence, which differs from the first PN sequence only in an inversion of the second chip value, provides for a) the provision of at least two subsequences of an initial code sequence, which is assigned to one of the first PN sequences and can be derived from said sequence by means of logical operations, but is not identical to it, b) the calculation of at least two correlation results by correlating the differentially demodulated signal with each of the at least two subsequences, and c) the evaluation of the correlation results and generation of an output signal to indicate the occupancy of the transmission channel depending on the evaluated correlation results.

The device of the invention comprises a) a sequence providing unit, which is designed to provide at least two subsequences of the aforementioned initial code sequence, b) at least two correlation units, which are each connected to the sequence providing unit and are designed to calculate at least two correlation results by correlating the differentially demodulated signal with each of the at least two subsequences, and c) an evaluation unit, which is connected to the correlation units and is designed to evaluate the correlation results and to generate an output signal to indicate the occupancy of the transmission channel depending on the evaluated correlation results.

The transmitting/receiving device of the invention and the integrated circuit of the invention each have this type of device.

The essence of the invention is to correlate the differentially demodulated signal, obtained from the received radio signal, with at least two subsequences of an initial code sequence matched to the differential demodulation, whereby the initial code sequence is assigned to one of the first PN sequences and can be derived from said sequence by logical operations, but is not identical to it.

The invention is based on the knowledge that during differential demodulation so-called derived sequences, matched to the differential demodulation, can be used advantageously for detecting (deciding). Each PN sequence that can be used transmitter-side is hereby assigned a derived sequence, which can be derived by logical operations from the PN sequence but is not identical to it. The derived sequences are notable in that they differ from one another in a cyclic shift of their chip values and/or in an inversion of all of their chip values.

The invention is based furthermore on the knowledge that the demodulated signal in each symbol period completely contains at least one half (and thereby also a third, fourth, etc.) of the same derived sequence, namely, in the original or inverted form. Based on the aforementioned properties of the derived sequences, this applies regardless of the time position of the symbol period (i.e., also when synchronization has not occurred) and to any of the derived sequences.

If any of the derived sequences are now used as the initial code sequence and the differentially demodulated signal is correlated, for example, both with the first half and also with the second half of this initial code sequence, at least one correlation peak results in each symbol period. A decision can be made advantageously from this correlation peak about the occupancy of the transmission channel.

In this manner, an incoming signal can also be detected as an IEEE 802.15.4 signal and differentiated from foreign signals (not generated according to IEEE 802.15.4) and thereby the occupancy of the transmission channel can then also be reliably determined, if the beginning of the (data) frame was not correctly determined, i.e., when no synchronization has yet occurred. Moreover, the invention makes possible very simple realizations of devices for detecting the occupancy of a transmission channel and thereby also of appropriate transmitting/receiving devices.

Such properties are advantageous particularly when—as in applications in industrial monitoring and control, sensor networks, and automation, or in the field of computer peripherals—an extremely low power requirement and a very simple realizability are indispensable. Although the invention is not limited to the IEEE standard 802.15.4, this is the case by way of example in transmitting/receiving devices for this standard.

In an embodiment, the subsequences of the initial code sequence are selected in such a way that their stringing together in the original or inverted state can produce the initial code sequence or a cyclically shifted variant of the initial code sequence. The complete division of the initial code sequence into subsequences, which in each case correspond to a section of adjacent chip values of the initial code sequence, enables a high reliability of the detection of the channel occupancy and simple and therefore power-saving implementations of the transmitting/receiving devices.

Precisely two subsequences can be provided and correlated with the differentially demodulated signal. This reduces the error rate in the detection of channel occupancy, because the two correlation results can be determined very precisely in this way based on the long subsequences.

According to another embodiment, the correlation results are evaluated by determining first a number p, which is a measure of how often within a predefined time interval one or more quantity (quantities) derived from the correlation results exceeds/exceed a first threshold. This number is then compared with the second threshold. Furthermore, an output signal is generated, which signals the occupancy of the transmission channel precisely when the number reaches or exceeds the second threshold. This type of two-stage evaluation of the correlation results enables very simple and thereby power-saving implementations of the device for detecting channel occupancy and thereby the transmitting/receiving devices.

In another embodiment, the number p can be determined: a) first by forming the amounts of the correlation results, b) then by comparing these amounts in each case with the first threshold, by generating at least two logical signals with a value of logical 1, if the specific value exceeds the first threshold, and a value of logical 0, if this is not the case, c) next by generating a total signal by ORing the logical signals, and d) finally by determining the number p by calculating the number of pulse rising edges, which the total signal has within the predefined time interval. In this embodiment, the transition into the binary region is made as soon as possible in the signal flow direction, so that the logical signal can be processed further advantageously with very simple means.

In another embodiment, the number p is determined a) first by forming the amounts of the correlation results, b) then by comparing these amounts in each case with the first threshold, by generating at least two logical signals with the value of logical 1, if the specific value exceeds the first threshold, and the value of logical 0, if this is not the case, c) by determining the numbers of pulse rising edges, which the logical signals have in each case within the predetermined time interval, and d) finally by determining the number p by adding the numbers of the rising edges. In this embodiment as well, the transition into the binary region is made as soon as possible. The edges of the pulses are nevertheless first counted here in each branch individually, which is advantageous in certain types of temporal provision of the correlation results.

According to another embodiment, the number p is determined a) first by forming the amounts of the correlation results, b) then by determining a sum by adding these amounts, c) by comparing the sum with the first threshold and by generating a logical signal with a value of logical 1, if the sum exceeds the first threshold, and a value of logical 0, if this is not the case, and d) by determining the number p by calculating the number of pulse rising edges, which the total signal has within the predefined time interval. In this embodiment, instead of binary (logical) signals, higher-level signals (the amounts of the correlation results) are combined (added) and then processed further. The efficiency of the channel occupancy detection can be advantageously improved in this way particularly under interference effects, i.e., error rates are reduced, because the individual amounts of the correlation results are constructively superposed before a decision.

In another embodiment, the derived chips (i.e., the chips of the initial code sequence) with a first positive index (i.e., all chips other than the first) each have a value that can be derived from an XOR operation of the PN chip (i.e., the chip of the first PN sequence to which the initial code sequence is assigned) with said first positive index with the indexwise preceding PN chip (and thereby preceding in time). Preferably, the first chip (with index 0) derived indexwise (and in time) has a value that can be derived from an XOR operation of the indexwise first PN chip (with index 0) with the indexwise last PN chip. The sequence providing unit, the correlation units, and the evaluation unit can be realized very simply with saving of power by the use of an initial code sequence of this type.

In an embodiment of the device of the invention, the correlation units can be part of a synchronization unit. The correlation units are doubled in this way, namely, used on the one hand for channel occupancy detection and on the other, for synchronization, so that advantageously no separate correlation units are needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
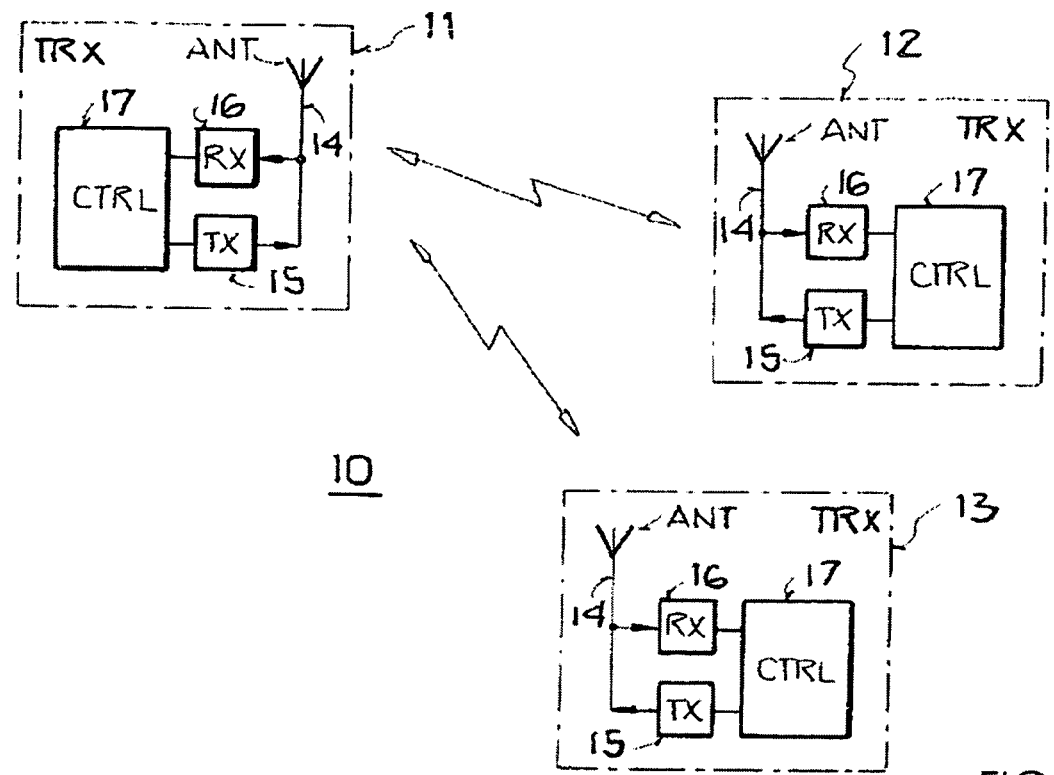
FIG. 1 shows an example of a "Wireless Personal Area Network" (WPAN) according to IEEE Standard 802.15.4 with transmitting/receiving devices of the invention.

In the figures, the same and functionally identical elements and signals, if not specified otherwise, are provided with the same reference characters.

FIG. 1 shows an example of a "Wireless Personal Area Networks" (WPAN) 10 according to IEEE Standard 802.15.4. It comprises three transmitting/receiving devices (transceiver, TRX) 11-13 in the form of stationary or mobile devices, which exchange information in a wireless manner by radio signals. Transmitting/receiving device 11 is a full-function device, which assumes the function of the WPAN coordinator, whereas transmitting/receiving devices 12, 13 are reduced-function devices, which are assigned to full-function device 11 and can only exchange data with the device 11. Apart from the star network topology depicted in FIG. 1, in which bidirectional data transmission can occur only between one of the reduced-function devices 12, 13 and full-function device 11, but not between reduced function devices 12, 13, the standard also provides so-called "peer-to-peer" topologies, in which all full-function devices (of which one assumes the role of the WPAN coordinator) can communicate with all other full-function devices.

Transmitting/receiving devices 11-13 each comprise an antenna 14, a transmitting unit (transmitter, TX) 15 connected to the antenna, a receiving unit (receiver, RX) 16 connected to the antenna, and a control unit (control unit, CTRL) 17, connected to the transmitting and receiving unit, to control transmitting and receiving units 15, 16. Furthermore, transmitting/receiving units 11-13 each contain a power supply unit, not shown in FIG. 1, in the form of a battery, etc., to supply power to units 15-17, and possibly other components such as sensors, interfaces, etc.

It will be assumed below that the data transmission occurs in the 2.4 GHz ISM band (industrial, scientific, medical). Transmitting unit 15 of each transmitting/receiving device converts the data stream to be transmitted according to IEEE Standard 802.15.4 into a radio signal to be emitted over its antenna 14 by first converting the data stream to be transmitted, as described in the introduction to the description, to four bit symbols d0, d1, d2, . . . and these into successive PN sequences (e.g., P5, P4, P7, if d0=5, d1=4, d2=7). The successive PN sequences are then offset QPSK modulated (quadrature phase shift keying) with half-sinus pulse formation.

Accordingly, receiving unit 16 of each transmitting/receiving device converts a radio signal received from its antenna 14 (and generated by the transmitting unit of another transmitting/receiving device according to IEEE Standard 802.15.4) into the transmitted data without errors if possible in that the radio signal is demodulated inter alia and the data are then detected (decided).

Transmitting unit 15 and receiving unit 16 of a transmitting/receiving device are hereby part of an integrated circuit (IC) (not shown in FIG. 1), e.g., an ASIC (application specific integrated circuit), whereas control unit 17 is a microcontroller (also not shown). Advantageously, the transmitting/receiving device can also have only one IC (e.g., made as an ASIC), which perceives the functions of transmitting unit 15, receiving unit 16, and control unit 17.

Figure 2:
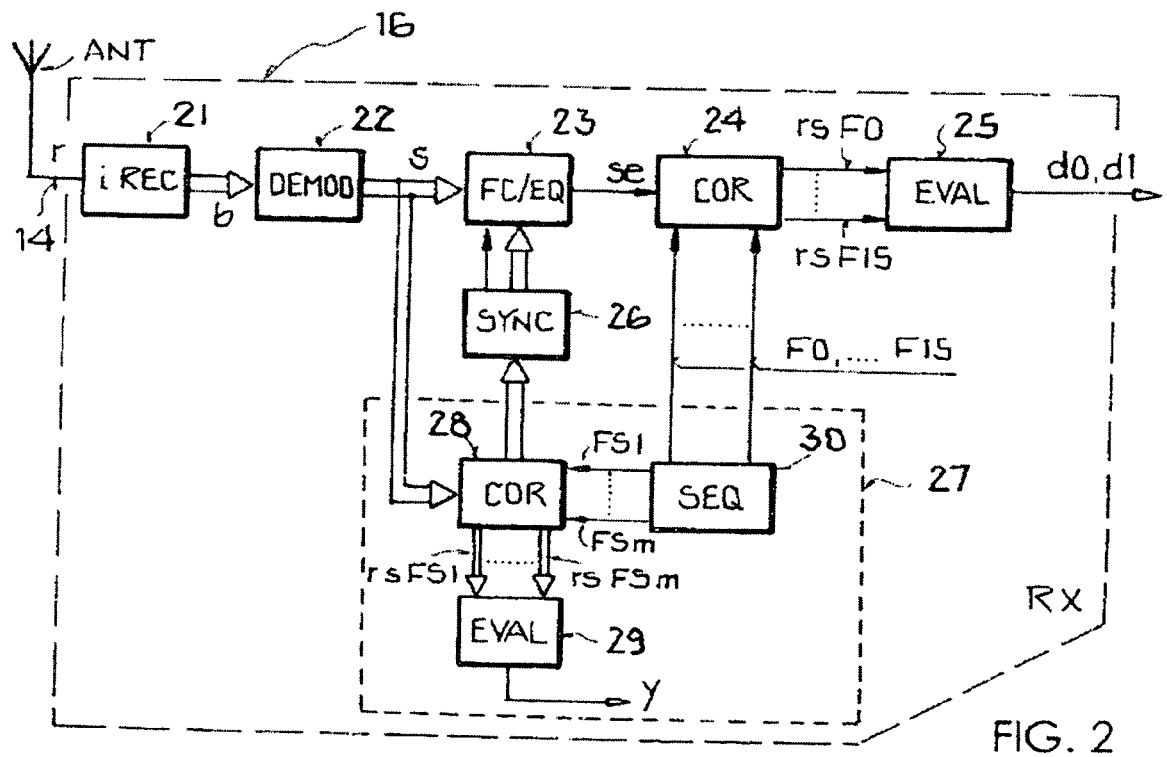
FIG. 2 is an example of an incoherent receiving unit (RX) with a device according to an embodiment of the invention.

FIG. 2 shows a block diagram of an incoherent receiving unit (RX) 16, which has the following functional blocks connected in series: an internal receiver (iREC) 21, a differential demodulator (DEMOD) 22, an FC/EQ unit 23 for frequency offset correction and/or equalization, a correlation unit 24, and an evaluation unit 25. Furthermore, receiving unit 16 has a synchronization unit 26 connected to FC/EQ unit 23 and a device of the invention 27 for determining the occupancy of the transmission channel, which is connected to demodulator 22, synchronization unit 26, and correlation unit 24. Device 27 has a correlation unit 28 connected to the differential demodulator 22 and the synchronization unit 26, an evaluation unit 29 connected downstream to the correlation unit 28, and a sequence providing unit 30 connected to both correlation units 24, 28.

Internal receiver 21 connected to antenna 14 of the transmitting/receiving device transmits the received radio signal r in a complex baseband signal b (envelope), which has sampling values, e.g., in the 4× clock of the PN chip, used transmitter-side, of the PN sequences (i.e., 4× chip clock 4*fC=8 MHz). Each complex sampling value hereby comprises a real part (in-phase component I) and an imaginary part (quadrature component Q). Complex-valued signals like the baseband signal b are depicted in the figures by arrows with double lines. Depending on the quality of the employed oscillators, the complex baseband signal b can be subject to a more or less highly pronounced frequency offset.

The baseband signal b is then converted by differential demodulator 22 into a demodulated signal s by multiplying in each case an undelayed "current" sampling value of the baseband signal b by the conjugated complex value of the sampling value delayed by one chip period TC=1/fC. The demodulated signal s has complex-valued sampling values, e.g., in the 4× chip clock.

Synchronization unit 26 calculates the information necessary for a symbol and chip clock synchronization. Preferably, it determines the optimal of the four phase positions of the demodulated signal s in the above example and calculates in addition a complex factor fOFF necessary for correcting the frequency offset.

In the FC/EQ unit 23, the demodulated signal s is synchronized according to the information from synchronization unit 26 and (under)sampled in such a way that signal values are present in the chip clock fC. A frequency offset is optionally corrected by multiplication by the complex factor fOFF. Advantageously, a signal is generated as a result, whose sampling values have so-called soft information values (higher level, e.g., 4-bit signal values) instead of so-called hard bits (i.e., two-stage, binary values). Furthermore, the demodulated signal is optionally equalized in FC/EQ unit 23. Equalizer 23 provided for this purpose determines a mean of the demodulated signal s preferably per symbol period TS=1/fS=16 μs=32*TC and releases this signal subsequently by subtracting the mean from a direct component. Alternatively or in addition, a filter, e.g., a high-pass filter, can be provided.

Next, the data symbols d0, d1, d2, . . . , contained in the differentially demodulated (and optionally equalized) signal se, are detected, i.e., decided. For this purpose, the signal se present in the chip clock fC is first correlated in correlation unit 24 with derived sequences F0, F1, . . . , F15, which are assigned to the PN sequences P0, P1, . . . , P15 usable transmitter-side (and derivable from these) and provided by sequence providing unit 30. This leads to the correlation results rsF0, rsF1, . . . , rsF15, which represent a measure of the agreement of the signal se with the particular derived sequence F0, F1, . . . , or F15. The correlation results are finally evaluated in evaluation unit 25 and the data symbols d0, d1, d2, . . . are detected (decided).

Apart from the derived sequences F0, F1, . . . , F15 sequence providing unit 30 advantageously also provides m≧2 subsequences FS1, FS2, . . . , FSm of an initial code sequence, such as, e.g., the derived sequence F0 (as an alternative, a second sequence providing unit can also be provided for this). These subsequences are correlated in correlation unit 28, which may also be part of synchronization unit 26, with the demodulated signal s, e.g., in the 4× chip clock. This leads to sliding correlation results (correlation functions) rsFS1, rsFS2, . . . , rsFSm, which represent a measure of the agreement of the signal s with the respective subsequence FS1, FS2, . . . , or FSm. The correlation results rsFS1, rsFS2, . . . , rsFSm are finally evaluated in evaluation unit 29 and an output signal y is generated, which indicates whether the transmission channel is occupied by a radio signal r, which was generated according to IEEE 802.15.4, or is free of such a signal. This CCA signal (clear channel assessment) y is transmitted to control unit 17 shown in FIG. 1, which releases transmitting unit 15 within the scope of CSMA-CA process, described in the introduction to the description, if the signal y indicates that the channel is free (y="IDLE"), or blocks transmitting unit 15, if the signal y indicates occupancy of the channel by a 802.15.4 signal (y="BUSY"). The individual function blocks of device 27 and their mode of operation are described in greater detail in regard to FIG. 3.

Because the subsequences FS1, FS2, . . . , FSm, provided by sequence providing unit 30, result from the derived sequences F0, F1, . . . , F7, it is first described below how the derived sequences F0, F1, . . . , F7 are obtained. The following table shows both PN sequences P0, P1, . . . , to be used according to IEEE 802.15.4 transmitter-side, and the derived sequences F0, F1, . . . , assigned to the PN sequences of the invention.

In regard to the PN sequences P0, P1, P2, . . . to be used transmitter-side, it must be determined first that a sequence set with a total of 16 PN sequences P0, P1, . . . , P15 is specified. Each PN sequence in this case comprises 32 so-called chips, each of which can assume a value of logical zero (0) or one (1). As is evident from the table, e.g., the first 10 chips of the PN sequence P5 assume the values 0 0 1 1 0 1 0 1 0 0.

For the chips, e.g., of the PN sequence P5, the parameters P5c0 (first chip (c0) of P5), P5c1 (second chip (c1)), . . . , P5c30, P5c31 (last chip (c31)) are introduced to simplify the description. This also applies to the other PN sequences, so that Picj designates the chip with index j (i.e., the (j+1)-th chip) of the PN sequence with index i (Pi), whereby i=0.1, . . . , 15 and j=0, 1, . . . , 31. Furthermore, to better differentiate the chips of the PN sequences from those of the derived sequences, the former are designated as PN chips.

If all 16 PN sequences P0, P1, . . . , P15 of the sequence set are divided into a first group PG1 of the eight "first" PN sequences P0, P1, . . . , P7 and a second group PG2 of the eight "second" PN sequences P8, P9, . . . , P15, it is evident further from the table that the first PN sequences P0, P1, . . . , P7 differ from each other only in a cyclic shift of their chip values. Thus, e.g., the bit pattern {1 1 0 1 1 0}, occurring at the start of the PN sequence P0, is evident-in a cyclic expansion-in the, PN sequence P1 starting at the PN chip P1c4, in the PN sequence P2 starting at P2c8, in P3 starting at P3c12, in P4 starting at P4c16, . . . , and finally in P7 starting at P7c28. The second PN sequences P8, P9, . . . , P15 as well differ from one another only in a cyclic shift of their chip values.

```
Pi: PN sequence i (transmitter-side)
(Pic0 Pic1 Pic2 Pic3 . . . Pic30 Pic31)
Fi: Sequence derived from Pi
(Fic0 Fic1 Fic2 Fic3 . . . Fic30 Fic31)
P0:    1 1 0 1 1 0 0 1 1 1 0 0 0 0 1 1 0 1 0 1 0 0 1 0 0 0 1 0 1 1 1 0

F0:    + + + - - - - - + + + - + + + + - + - + + + - - + + - + + - -

P1:    1 1 1 0 1 1 0 1 1 0 0 1 1 1 0 0 0 0 1 1 0 1 0 1 0 0 1 0 0 0 1 0

F1:    + + - - + + + - - - - - + + + - + + + + - + - + + + - - + + -

P2:    0 0 1 0 1 1 1 0 1 1 0 1 1 0 0 1 1 1 0 0 0 0 1 1 0 1 0 1 0 0 1 0

F2:    - + + - + + - - + + + - - - - - + + + - + + + + - + - + + + -

P3:    0 0 1 0 0 0 1 0 1 1 1 0 1 1 0 1 1 0 0 1 1 1 0 0 0 0 1 1 0 1 0 1

F3:    + + + - - + + - + + - - + + + - - - - - + + + - + + + + - + -

P4:    0 1 0 1 0 0 1 0 0 0 1 0 1 1 1 0 1 1 0 1 1 0 0 1 1 1 0 0 0 0 1 1

F4:    + - + - + + + - - + + - + + - - + + + - - - - - + + + - + + +

P5:    0 0 1 1 0 1 0 1 0 0 1 0 0 0 1 0 1 1 1 0 1 1 0 1 1 0 0 1 1 1 0 0

F5:    - + + + - + - + + + - - + + - + + - - + + + - - - - - + + +

P6:    1 1 0 0 0 0 1 1 0 1 0 1 0 0 1 0 0 0 1 0 1 1 1 0 1 1 0 1 1 0 0 1

F6:    - + + + - + + + + - + - + + + - - + + - + + - - + + + - - - - -

P7:    1 0 0 1 1 1 0 0 0 0 1 1 0 1 0 1 0 0 1 0 0 0 1 0 1 1 1 0 1 1 0 1

F7:    - - - - - + + + - + + + + - + - + + + - - + + - + + - + + - + + + -

P8:    1 0 0 0 1 1 0 0 1 0 0 1 0 1 1 0 0 0 0 0 0 1 1 1 0 1 1 1 1 0 1 1

F8:    - - - + + + + + + - - - + - - - - + - + - - - + + - - + - - + +

P9:    1 0 1 1 1 0 0 0 1 1 0 0 1 0 0 1 0 1 1 0 0 0 0 0 0 1 1 1 0 1 1 1

F9:    - - + + - - - + + + + + - - - + - - - - + - + - - - + + - - +

P10:   0 1 1 1 1 0 1 1 1 0 0 0 1 1 0 0 1 0 0 1 0 1 1 0 0 0 0 0 0 1 1 1

F10:   + - - + - - + + + - - - + + + + + - - - + - + - - - + - + - - - +

P11:   0 1 1 1 0 1 1 1 1 0 1 1 1 0 0 0 1 1 0 0 1 0 0 1 0 1 1 0 0 0 0 0

F11:   - - - + + - - + - - + + - - + + + + + - - - + - - - - - + - +

P12:   0 0 0 0 0 1 1 1 0 1 1 1 1 0 1 1 1 0 0 0 1 1 0 0 1 0 0 1 0 1 1 0

F12:   - + - + - - - + + - + - - + + - - - + + + + + + - - - + - - -

P13:   0 1 1 0 0 0 0 0 0 1 1 1 0 1 1 1 1 0 1 1 1 0 0 0 1 1 0 0 1 0 0 1

F13:   + - - - - + - + - - - + - - + - - + + - - + + + + + + + - - -
```

-continued
```
P14:  1 0 0 1 0 1 1 0 0 0 0 0 0 1 1 1 0 1 1 1 1 0 1 1 1 0 0 0 1 1 0 0

F14:  + - - - + - - - - + - + - - - + + - - + - - + + - - - + + + + +

P15:  1 1 0 0 1 0 0 1 0 1 1 0 0 0 0 0 0 1 1 1 0 1 1 1 1 0 1 1 1 0 0 0

F15:  + + + + + - - - + - - - - + - + - - - + + - - + - - + + - - - +
```

It is evident furthermore that for each first PN sequence of the first group PG1 there is a second PN sequence of the second group PG2, which differs from this first PN sequence of the first group PG1 only in every second chip value-namely, in an inversion of every second chip value. If, e.g., the PN sequences P0 from PG1 and P8 from PG2 in the table are compared, it is found that the even-indexed PN chips have identical values (P0c0=P8c0=1; P0c2=P8c2=0; P0c4=P8c4=1; etc.), whereas the odd-indexed PN chips have different values (inverted to one another) (P0c=1, P8c1=0, P0c3=1, P8c3=0; P0c5=0, P8c5=1, etc.).

Each PN sequence according to the invention is assigned a nonidentical derived sequence, matched to the differential demodulation; for example, the PN sequence P0 is assigned the derived sequence F0 listed in the table below P0, the PN sequence P1 the derived sequence F1, etc. The chips of the derived sequences, here designated as derived chips, can assume the antipodal values +1 and −1, whereby for reasons of clarity only the sign of these values is entered in the table. In analogy to the designation for the PN chips introduced above, the derived chip with index j of the derived sequence with index i is designated below with Ficj, whereby i=0, 1, . . . , 15 and j=0, 1, . . . , 31.

The values of the derived chips result as follows from the values of the PN chips. In order to form, e.g., the value of the derived chip F0c2, which is +1 according to the table, the value of the PN chip P0c2=0, entered directly above in the table, is to be XORed logically with the value of the PN chip P0c2=1, entered to the left (i.e., preceding in time) of P0c2. The logical XOR operation in this case produces a value of logical 1, which is assigned the antipodal value +1 entered in the table for F0c2. Accordingly, the value of F0c4 results from P0c4 XOR P0c3=1 XOR 1=0 as the value of −1 entered in the table for F0c4, because logical 0 is assigned an antipodal value of −1. This derivation rule applies to all derived chips with a positive even index. If, therefore, Ficj designates the derived chip with index j of the derived sequence with index i and Picj and Picn the PN chip with index j or n of the PN sequence with index i, for positive even indexes j of the derived chip Ficj for i=0, 1, . . . , 15 is given as:

$$Ficj = 2*(Picj\ XOR\ Picn) - 1 \text{ with } n=j-1 \text{ for } j=2, 4, 6, \ldots, 30 \quad (1)$$

whereby the multiplication of the result of the XOR operation by the factor 2 and the subsequent subtraction of 1 is to reflect the assignment of the logical values of 0 and 1 to the antipodal values −1 or +1.

To form the derived chip Ficj with index j=0, the last PN chip Picn with n=31 is to be used instead of the (nonexistent) PN chip Picn, preceding in time, with index n=j−1=−1, i.e., $$Ficj = 2*(Picj\ XOR\ Picn) - 1 \text{ with } j=0 \text{ and } n=31 \text{ for } i=0, 1, \ldots, 15 \quad (2)$$

A derivation rule similar to equation (1) applies to the derived chips Ficj with the odd index j. In this case, the result of the XOR operation is to be inverted before the assignment to antipodal values:

$$Ficj = 2*INV\{Picj\ XOR\ Picn\} - 1 \text{ with } n=j-1 \text{ for } j=1, 3, 5, \ldots, 31 \quad (3)$$

whereby INV{ } designates the logical inversion and i=0, 1, . . . , 15 applies again.

Instead of the inversion of logical values with the subsequent assignment of logical 0 to the antipodal value −1 and of logical 1 to the antipodal value +1, naturally also a different assignment can be used, namely, of logical 0 to the antipodal value +1 and of logical 1 to the antipodal value −1, and therefore the logical inversion can be omitted. The following then results as the formula:

$$Ficj = 1 - 2*(Picj\ XOR\ Picn) \text{ with } n=j-1 \text{ for } j=1, 3, 5, \ldots, 31 \quad (3')$$

The use of the PN chip "current" in each case (with the index of the derived chip to be formed) and of the preceding PN chip corresponds to the transmitter-side division, described in the introduction to the description, of the even- (odd-)indexed PN chips on the in-phase (I) carrier (quadrature-phase (Q) carrier) within the scope of the offset QPSK modulation (quadrature phase shift keying). Other transmitter-side I/Q separations of the PN chips require an appropriately matched formation of the derived chips.

If all 16 derived sequences F0, F1, . . . , F15 are divided into a third group FG1 of the eight derived sequences F0, F1, . . . , F7 and a fourth group FG2 of the eight derived sequences F8, F9, . . . , F15, it is evident from the table that the derived sequences F0, F1, . . . , F7 of the third group FG1 differ from one another only in a cyclic shift of their chip values. Thus, e.g., the bit pattern {+++---}, occurring at the start of the derived sequence F0, can be seen—in a cyclic expansion—in the derived sequence F1 starting at the derived chip F1c4, in the derived sequence F2 starting at F2c8, in F3 starting at F3c12, in F4 starting at F4c16, . . . , and finally in F7 starting at F7 c28. The derived sequences F8, F9, . . . , F15 of the fourth group FG2 also differ from one another only in a cyclic shift of their chip values.

It is to be stated, furthermore, that for each derived sequence of the third group FG1 there is a derived sequence of the fourth group FG2, which differs only in an inversion of all of its chip values. If, e.g., the derived sequence F0 from FG1 is compared with F8 from FG2 in the table, it is found that all chip values are inverted. Because this also applies to the sequence pairs F1/F9, F2/F10, etc., it can be established that all derived sequences of the third group FG1 are contained in inverted form in the fourth group FG2:

$$Ficj = (-1)*Fncj \text{ with } i=0, 1, \ldots, 7, n=i+8 \text{ and } j=0, 1, \ldots, 31 \quad (4)$$

In contrast to the PN sequences, in which the corresponding sequence pairs P0/P8, P1/P9, etc. differ in an inversion of every second PN chip, the corresponding pairs F0/F8, F1/F9, etc., of derived sequences differ in an inversion of all of their chip values.

The properties, indicated in the previous paragraphs, of the derived sequences enable extremely simple realizations of correlation unit 28, evaluation unit 29, and sequence providing unit 30, and thereby device 27 of FIG. 2.

Figure 3:
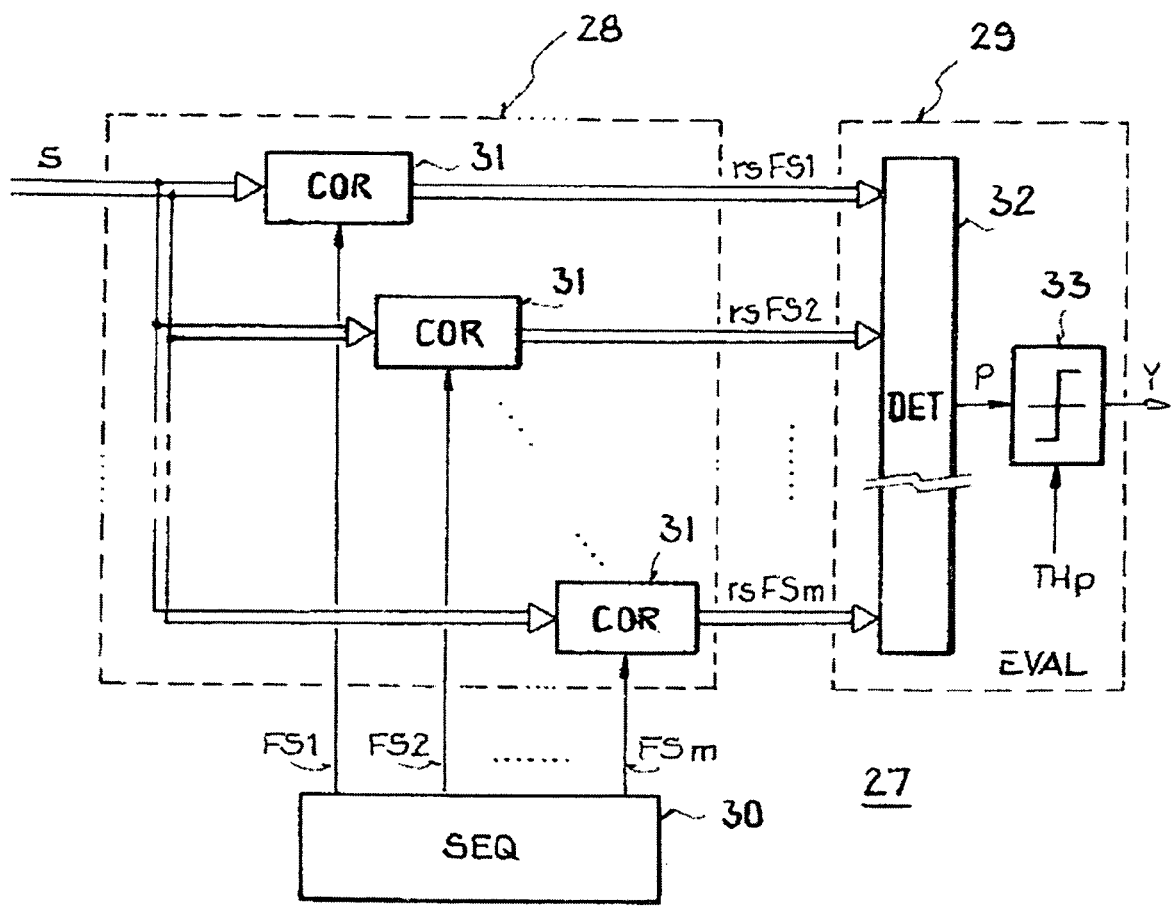
FIG. 3 illustrates an embodiment of the device of the invention.

FIG. 3 shows an exemplary embodiment of a device of the invention 27 of FIG. 2. In this exemplary embodiment, sequence providing unit (SEQ) 30 provides a total of m≧2 subsequences FS1, FS2, . . . , FSm of the initial code sequence F0, i.e., the derived sequence F0, which is assigned to the PN sequence P0 and was explained in regard to the previous table. The subsequences FS1, FS2, . . . , FSm here correspond in each case to a section of the sequence F0, the sections preferably having a uniform length. If the original or inverted subsequences are strung together, the result is again preferably the sequence F0 or the sequence F8 inverted hereto—or a cyclically shifted version of F0 or F8, for example, one of the other derived sequences. In principle, therefore, each of the derived sequences F0, . . . , F15 can be used therefore as the initial code sequence, because, as explained above, these differ from one another at most in a cyclic shift and/or an inversion of all chip values.

Apart from sequence providing unit 30, device 27 comprises a total of m correlation units 31 in each case connected to differential demodulator 22 (FIG. 2) and sequence providing unit 30, a determination unit 32 connected to the m correlation units 31, and a first decision unit 33 connected downstream to determination unit 32. The correlation units 31 hereby can also be part of synchronization unit 26 of FIG. 2.

Each correlation unit 31 in this case correlates the differentially demodulated signal s with one of the subsequences FS1, FS2, . . . , FSm and in this way calculates one of the (sliding) correlation results (correlation functions) rsFS1, rsFS2, rsFSm, e.g., in the 4× chip clock. The correlation results rsFS1, rsFS2, . . . , rsFSm are evaluated in determination unit 32 and a number p is determined, which is a measure of how often within a predefined time interval of, for example, eight symbol periods 8*TS=128 µs (corresponds to the length of the preamble sequence) one or more of the quantity/quantities derived from the correlation results rsFS1, rsFS2, . . . , rsFSm exceeds/exceed a first threshold. In the first decision unit 33, this number p is compared with a second threshold THp and an output signal y is generated, which signals the occupancy of the transmission channel precisely when the number p reaches or exceeds the second threshold THp:

$y=$"BUSY," if $p \geq THp$ ("channel is occupied")

$y=$"IDLE," otherwise ("channel is free").

According to an embodiment, precisely m=2 subsequences are used, the first subsequence FS1 corresponding to the first half and the second subsequence FS2 to the second half of the initial code sequence. The first subsequence FS1 and/or the second subsequence FS2 can also be inverted here in comparison with the respective half of the initial code sequence. In these cases, a very reliable and robust detection of the channel occupancy is achieved, because the two correlation results rsFS1, rsFS2 are determined with a high accuracy due to the relatively long subsequences FS1, FS2.

If, e.g., the derived sequence F0 is again used as the initial code sequence, according to the above table the following subsequences result $FS1=\{+++------+++-+++\}$ and (5a)

$FS2=\{+-+-+++--++-++--)\}$ (5b)

or the subsequences inverse hereto. In the case of m=3 subsequences, finally the division of the initial code sequence into a first, second, and third third is advantageous.

FIG. 4 shows three block diagrams of different realization forms of the determination unit 32 of FIG. 3. Although according to the above explanations preferably precisely m=2 subsequences are used and thereby two correlation results rsFS1, rsFS2 are to be evaluated by determination unit 32, for reasons of general applicability of the description, a total of m≧2 (sliding) correlation results (correlation functions) to be evaluated rsFS1, rsFS2, . . . , rsFSm are assumed in the description.

Figure 4A:
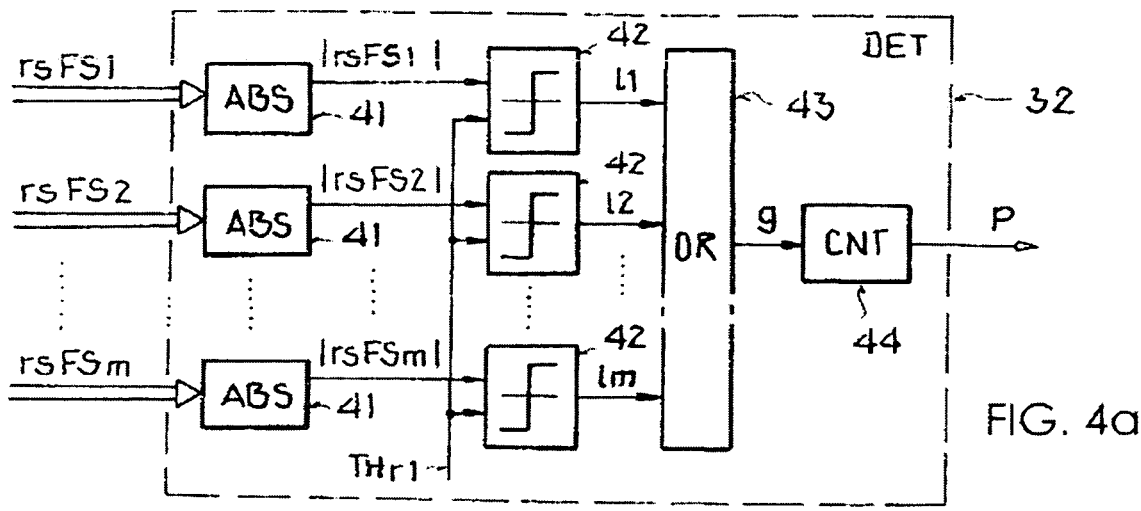
FIGS. 4a-c show examples of a determination unit of FIG. 3.

The first realization form of determination unit 32, as depicted in FIG. 4a, comprises m parallel branches, each connected to a correlation unit 31 (see FIG. 3), of one each absolute value generating unit (ABS) 41 and a downstream second decision unit 42. The m branches open into an OR gate (OR) 43, which is connected to the m second decision units 42 and on the output side to a counter unit (CNT) 44.

First, the (absolute) amounts |rsFS1|, |rsFS2|, . . . , |rsFSm| of the complex-valued correlation results rsFS1, rsFS2, . . . , rsFSm are generated with use of the m absolute value generating units 41. These amounts are then compared in the m second decision units 42 each time with the first threshold THr1 and a total of m logical signals I1, I2, . . . , Im are generated, which have a value of logical 1, if the particular amount exceeds the first threshold THr1, and a value of logical 0, if this is not the case. The m logical signals I1, I2, . . . , Im are then logically ORed by means of OR gate 43 and thus a total signal g is generated, which always has a value of logical 1 when at least one of the amounts exceeds the first threshold THr1, and otherwise assumes a value of logical 0. Finally, the number p is determined by the counter unit 44 by determining the number of pulse rising edges, which the total signal g has within the predefined time interval of, e.g., eight symbol periods 8*TS. If the correlation results are aligned in time in such a way that the amount maxima in the different branches occur substantially simultaneously, counter unit 44 within the given time interval then typically determines a value of p=8, if the channel is occupied by a radio signal according to IEEE 802.15.4. In this case, the second threshold THp of the first decision unit 33 of FIG. 3 is preferably defined as THp=8. If the amount maxima of the correlation results in the different branches do not occur simultaneously, however, THp is preferably selected as 8*m.

Figure 4B:
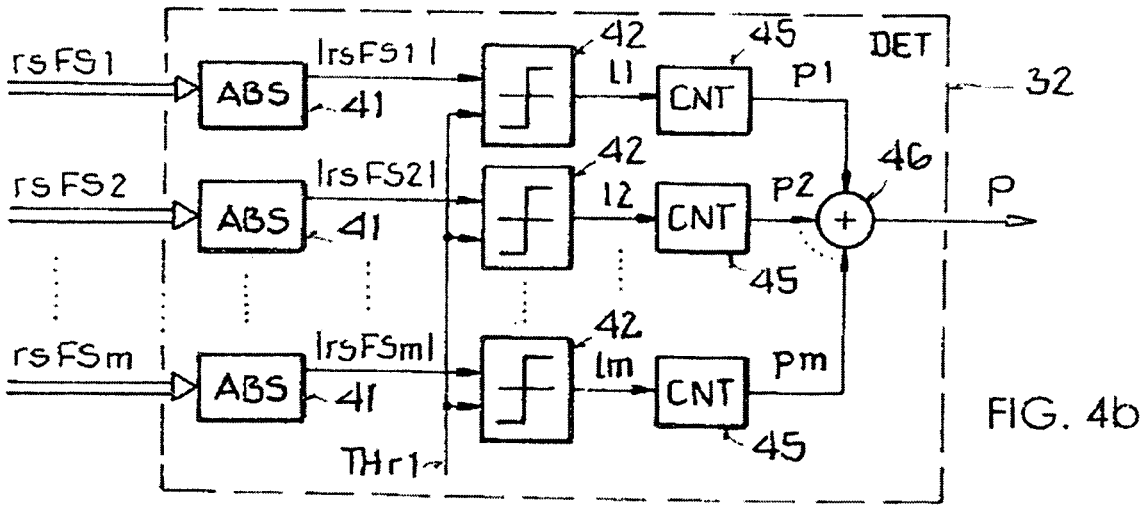

FIG. 4b shows a second realization form of determination unit 32, which comprises m parallel branches, each connected to a correlation unit 31 (see FIG. 3), of one absolute value generating unit (ABS) 41, a downstream second decision unit 42, and a downstream counter unit (CNT) 45. The m branches finally open into an addition element 46 connected to the m counter units 45.

In analogy to the first realization form according to FIG. 4a, first, with the use of absolute value generating units 41 and second decision units 42, a total of m logical signals I1, I2, . . . , Im are generated, which have a value of logical 1, if the specific amount exceeds the first threshold THr1, and a value of logical 0, if this is not the case. In contrast to the first realization form of FIG. 4a, the m logical signals I1, I2, . . . , Im are then not combined into a total signal g, but according to FIG. 4b supplied individually to the respective counter units 45. Each counter unit 45 in this case determines the number of pulse rising edges, which the corresponding logical signal has at the input to the counter unit within a predefined time interval of, e.g., eight symbol periods 8*TS. The numbers p1, p2, . . . , pm resulting in this way in the m parallel branches are then added in the addition element 46 to determine the number p. In this way, pulses of different logical signals, which overlap in time, enter into the number p repeatedly. If the channel is occupied by a radio signal according to IEEE 802.15.4, counter units 45 determine within the given time interval typically in each case a value of p1=p2= . . . =8, which is why the second threshold THp of the first decision unit 33 of FIG. 3 is preferably defined as THp=8*m in this case.

Figure 4C:
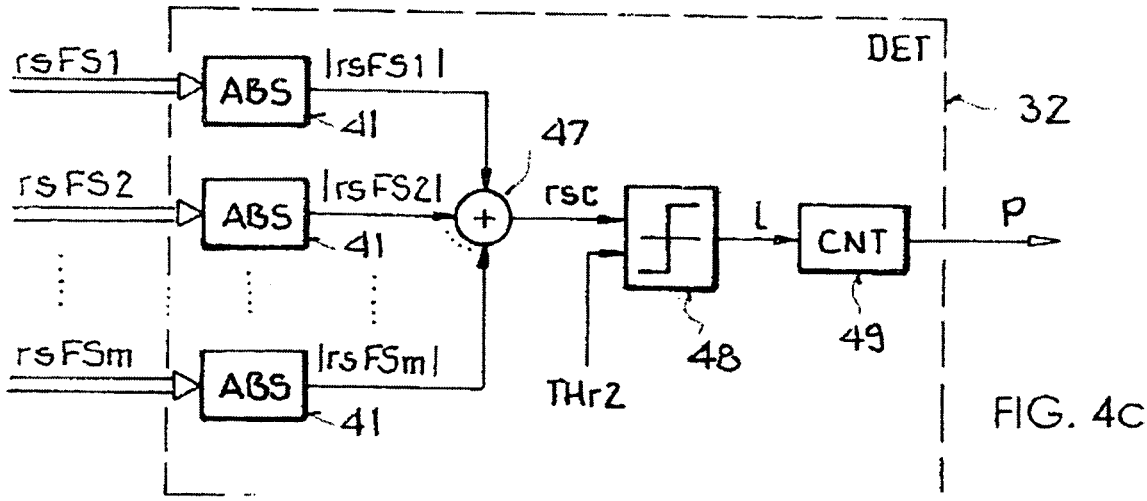

The third realization form of the determination unit 32, as depicted in FIG. 4c, also comprises m parallel branches, each connected to a correlation unit 31 (see FIG. 3), but having only one absolute value generating unit (ABS) 41. The m branches open into an addition element 47, which is connected to absolute value generating units 41 and to which a second decision unit 48 and a counter unit (CNT) 49 are connected downstream in series.

In analogy to the first and second realization form according to FIG. 4a or 4b, first the (absolute) amounts |rsFS1|, |rsFS2|, ..., |rsFSm| of the complex-valued correlation results rsFS1, rsFS2, ..., rsFSm are generated with use of absolute value generating units 41. Next, the amounts |rsFS1|, |rsFS2|, ..., |rsFsm| are added by addition element 47 and the sum rsc is formed in this way. In the second decision unit 48, the sum rsc is compared with the first threshold THr2 and a logical signal I is generated, which has a value of logical 1, if the sum rsc exceeds the first threshold THr2, and a value of logical 0, if this is not the case. The downstream counter unit 49 then determines the number p by determining the number of pulse rising edges, which the logical signal I has within a predefined time of, e.g., eight symbol periods 8*TS. If at a 802.15.4 radio signal the amount maxima of the correlation results occur substantially simultaneously in the different branches, then a higher first threshold THr2 of, for example, THr2=m*THr1 and a second threshold THp of the first decision unit 33 of FIG. 3 of THp=8 is to be selected here preferably. If the amount maxima of the correlation results in the different branches do not occur simultaneously, however, THr2=THr1 and THp=8*m are preferably selected.

Other functionally equivalent realization forms can be derived in a simple manner from the realization forms of determination unit 32, described above with reference to FIG. 4. Thus, e.g., the logical signals I1, I2, ..., Im, and/or g can be inversely defined (logical 1, if the threshold is not exceeded) and/or the counter units are directed to falling instead of rising edges.

Figure 5:
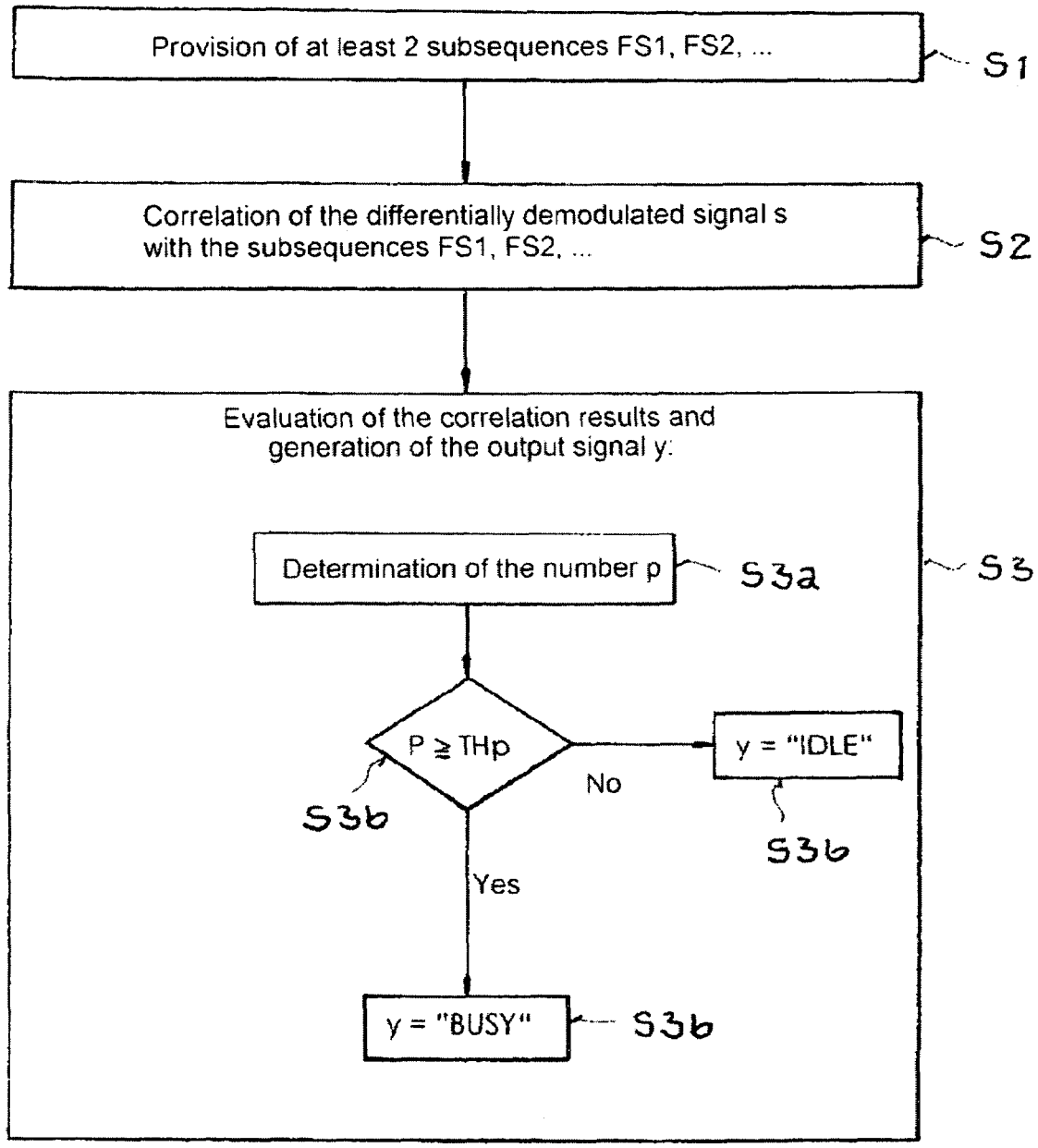
FIG. 5 illustrates a flowchart of an embodiment of the invention.

FIG. 5 shows a flow diagram of the method of the invention to determine the occupancy of a transmission channel by a radio signal.

First, m≧2 subsequences FS1, FS2, ..., FSm of the initial code sequence F0 are provided in step S1. The subsequences FS1, FS2, ..., FSm and their provision and the initial code sequence F0 are described in greater detail above with reference to FIGS. 2 and 3 and to the table.

Next, in step S2 m correlation results rsFS1, rsFS2, ..., rsFSm are calculated by correlating the differentially demodulated signal s with each of the m subsequences FS1, FS2, ..., FSm. The calculation of the correlation results rsFS1, rsFS2, ..., rsFSm is described in greater detail above with reference to FIGS. 2 and 3.

Finally, the m correlation results rsFS1, rsFS2, ..., rsFSm are evaluated in step S3 and an output signal y is generated, which indicates the occupancy of the transmission channel. For this purpose, first a number p is determined in step S3a. In step S3b, this number is compared with a second threshold THp and the output signal is set to "BUSY" (channel occupied), if the number p is greater or equal to the second threshold THp, and otherwise set to "IDLE" (channel free). The number p, the second threshold THp, and the evaluation of the correlation results and the generation the output signal y are described in greater detail above with reference to FIGS. 2 to 4.

Although the present invention was described above with the help of exemplary embodiments, it is not limited thereto but can be modified in many ways. Thus, the invention is limited neither to WPANs per se nor to WPANs according to IEEE 802.15.4 or the PN sequences specified therein (number and length of the sequences, stepping and values of the chips etc.), rates, and the stepping of the chips/symbols/bits, etc. The invention is also not limited to the derived sequences given in the aforesaid table. Various equivalent logical relationships can be given for the association between the derived chips and the PN chips.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining an occupancy of a transmission channel by a radio signal based on a differentially demodulated signal, which was generated at a transmitter-side with the use of PN sequences from a PN sequence set, which has a first group of first PN sequences and a second group of second PN sequences, the first and second PN sequences within their respective group differing from one another in a cyclic shift of their chip values, and the second group has for each first PN sequence a corresponding second PN sequence, which differs from the first PN sequence in an inversion of every second chip value, the method comprising the steps of:
    providing at least two subsequences of an initial code sequence, which is assigned to one of the first PN sequences and is derived from the one of the first PN sequences by a logical operation;
    calculating at least two correlation results via a correlation unit by correlating the differentially demodulated signal with each of the at least two subsequences;
    evaluating the correlation results; and
    generating an output signal indicating the occupancy of the transmission channel depending on the evaluated correlation results.

2. The method according to claim 1, wherein the subsequences of the initial code sequence are selected so that their stringing together in the original or inverted state produces the initial code sequence or a cyclically shifted variant of the initial code sequence.

3. The method according to claim 1, wherein the evaluation of the correlation results and the generation of the output signal comprise the steps of:
    determining a number, which is a measure of how often within a predefined time interval one or more quantities derived from the correlation results exceed a first threshold;
    comparing the number with a second threshold; and
    generating an output signal, which signals the occupancy of the transmission channel when the number reaches or exceeds the second threshold.

4. The method according to claim 3, wherein the determination of the number comprises the steps of:
    forming amounts of the correlation results;
    comparing the amounts of the correlation results with the first threshold and generating at least two logical signals with a value of logical 1, if the specific amount exceeds the first threshold, and a value of logical 0 otherwise;
    generating a total signal by an OR operation of the logical signals; and determining the number by determining a number of pulse rising edges, which the total signal has within the predefined time interval.

5. The method according to claim 3, wherein the determination of the number comprises the steps of:
forming the amounts of the correlation results;
comparing the amounts of the correlation results with the first threshold and generating at least two logical signals with a value of logical 1, if the specific amount exceeds the first threshold, and a value of logical 0 otherwise;
determining numbers of pulse rising edges, which the logical signals have in each case within the predefined time interval; and
determining the number by adding the numbers of the rising edges.

6. The method according to claim 3, wherein the determination of the number comprises the steps of:
forming of the amounts of the correlation results;
determining a sum by adding the amounts of the correlation results;
comparing the sum with the first threshold and generating a logical signal with a value of logical 1, if the sum exceeds the first threshold, and a value of logical 0 otherwise; and
determining the number by determining the number of pulse rising edges, which the logical signal has within the predefined time interval.

7. The method according to claim 1, wherein the initial code sequence has derived chips whose values each correspond to a logical operation of the respective PN chips of the first PN sequence that is assigned the initial code sequence.

8. The method according to claim 7, wherein the derived chips with a first positive index each have a value that is derived from an XOR operation of the PN chips with the first positive index with an indexwise preceding PN chip.

9. The method according to claim 8, wherein the indexwise first derived chip has a value that is derived from an XOR operation of the indexwise first PN chip with the indexwise last PN chip (P0c31).

10. The method according to claim 8, wherein the derived even-index chips each have a value that is assigned to the respective XOR operation, and wherein the derived odd-indexed chips each have a value that is assigned to the inverted value of the respective XOR operation.

11. A device for determining an occupancy of a transmission channel by a radio signal on the basis of a differentially demodulated signal, which was generated at a transmitter-side with PN sequences from a PN sequence set, which has a first group of first PN sequences and a second group of second PN sequences, the first and second PN sequences within their respective group differing from one another in a cyclic shift of their chip values, and the second group having for each first PN sequence a corresponding second PN sequence, which differs from the first PN sequence in an inversion of every second chip value, the device comprising:
a sequence providing unit that provIdes at least two subsequences of an initial code sequence, the initial code sequence being assigned to one of the first PN sequences and can be derived from the one of the first PN sequences by logical operations;
at least two correlation units that are each connected to the sequence providing unit and calculate at least two correlation results by correlating the differentially demodulated signal with each of the at least two subsequences; and
an evaluation unit that is connected to the correlation units and evaluates the correlation results and generates an output signal to indicate the occupancy of the transmission channel depending on the evaluated correlation results.

12. The device according to claim 11, wherein the evaluation unit comprises:
a determination unit being connected to the correlation units, to determine a number, which is a measure of how often within a predefined time interval one or more quantities derived from the correlation results exceed a first threshold; and
a first decision unit being connected to the determination unit to compare the number with a second threshold and to generate the output signal, which signals the occupancy of the transmission channel when the number reaches or exceeds the second threshold.

13. The device according to claim 12, wherein the evaluation unit comprises:
at least two absolute value generating units, each being connected to a correlation unit to form amounts of the correlation results;
at least two second decision units being connected to one of the absolute value generating units to compare the amounts of the correlation results with the first threshold and to generate at least two logical signals with a value of logical 1, if the specific amount exceeds the first threshold, and a value of logical 0 otherwise;
an OR gate being connected to the second decision units to generate a total signal by an OR operation of the logical signals; and
a counter unit being connected to the OR gate to determine the number by determining a number of pulse rising edges, which the total signal has within the predefined time interval.

14. The device according to claim 12, wherein the determination unit comprises:
at least two absolute value generating units, each being connected to a correlation unit to form amounts of the correlation results;
at least two second decision units, each being connected to one of the absolute value generating units to compare the amounts of the correlation results with the first threshold and to generate at least two logical signals with a value of logical 1, if the specific amount exceeds the first threshold, and a value of logical 0 otherwise;
at least two counter units, each being connected to one of the two decision units to determine the numbers of the pulse rising edges, which the logical signals have in each case within the predefined time interval; and
an addition element being connected to the counter units to determine the number by adding the numbers of the rising edges.

15. The device according to claim 12, wherein the determination unit further comprises:
at least two absolute value generating units, each being connected to a correlation unit to form amounts of the correlation results;
an addition element being connected to the absolute value generating units to determine a sum by adding the amounts of the correlation results;
a second decision unit being connected to the addition element to compare the sum with the first threshold and to generate a logical signal with a value of logical 1, if the sum exceeds the first threshold, and a value of logical 0 otherwise;
a counter unit being connected to the second decision unit to determine the number by determining the number of pulse rising edges, which the logical signal has within the predefined time interval.

16. The device according to claim 11, wherein the correlation units are part of a synchronization unit.

17. A device for determining an occupancy of a transmission channel by a radio signal on the basis of a differentially demodulated signal, which was generated at a transmitter-side with PN sequences from a PN sequence set, which has a first group of first PN sequences and a second group of second PN sequences, the first and second PN sequences within their respective group differing from one another in a cyclic shift of their chip values, and the second group having for each first PN sequence a corresponding second PN sequence, which differs from the first PN sequence in an inversion of every second chip value, the device comprising:
   sequence providing means for providing at least two subsequences of an initial code sequence, the initial code sequence being assigned to one of the first PN sequences and can be derived from the one of the first PN sequences by logical operations;
   at least two correlation means, each connected to the sequence providing means, for calculating at least two correlation results by correlating the differentially demodulated signal with each of the at least two subsequences; and
   evaluation means connected to the at least two correlation means for evaluating the correlation results and generating an output signal to indicate the occupancy of the transmission channel depending on the evaluated correlation results.

18. The device according to claim 17, wherein the evaluation means comprises:
   determination means, connected to the correlation means, for determining a number, which is a measure of how often within a predefined time interval one or more of quantities derived from the correlation results exceed a first threshold; and
   first decision means, connected to the determination means, for comparing the number with a second threshold and generating the output signal, which signals the occupancy of the transmission channel when the number reaches or exceeds the second threshold.

19. The device according to claim 18, wherein the evaluation means comprises:
   at least two absolute value generating means, each connected to a correlation means, to form amounts of the correlation results;
   at least two second decision means, connected to one of the absolute value generating means, for comparing the amounts of the correlation results with the first threshold and for generating at least two logical signals with a value of logical 1 if the specific amount exceeds the first threshold, and a value of logical 0 otherwise;
   an OR gate connected to the second decision means for generating a total signal by an OR operation of the logical signals; and
   counter means, connected to the OR gate, for determining the number by determining a number of pulse rising edges, which the total signal has within the predefined time interval.

20. The device according to claim 18, wherein the determination means comprises:
   at least two absolute value generating means, each connected to a correlation means to form amounts of the correlation results;
   at least two second decision means, each connected to one of the absolute value generating means, for comparing the amounts of the correlation results with the first threshold and for generating at least two logical signals with a value of logical 1 if the specific amount exceeds the first threshold, and a value of logical 0 otherwise;
   at least two counter means, each connected to one of the two decision means, for determining the numbers of the pulse rising edges, which the logical signals have in each case within the predefined time interval; and
   an addition means, connected to the counter means, for determining the number by adding the numbers of the rising edges.

21. The device according to claim 18, wherein the determination means further comprises:
   at least two absolute value generating means, each connected to a correlation means, for forming amounts of the correlation results;
   addition means connected to the absolute value generating means for determining a sum by adding the amounts of the correlation results;
   second decision means, connected to the addition means, for comparing the sum with the first threshold and for generating a logical signal with a value of logical 1 if the sum exceeds the first threshold, and a value of logical 0 otherwise; and
   counter means connected to the second decision unit for determining the number by determining the number of pulse rising edges, which the logical signal has within the predefined time interval.

22. The device according to claim 17, wherein the correlation means are part of a synchronization means.

* * * * *